(12) United States Patent
Tomoda

(10) Patent No.: US 7,970,352 B2
(45) Date of Patent: Jun. 28, 2011

(54) WIRELESS COMMUNICATION DEVICE

(75) Inventor: Ichiro Tomoda, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 122 days.

(21) Appl. No.: 12/544,072

(22) Filed: Aug. 19, 2009

(65) Prior Publication Data

US 2010/0056046 A1  Mar. 4, 2010

(30) Foreign Application Priority Data

Aug. 29, 2008  (JP) ................................. 2008-221473

(51) Int. Cl.
*H04B 7/00* (2006.01)

(52) U.S. Cl. ..................... 455/41.2; 455/41.1; 340/539.1

(58) Field of Classification Search .................. 455/41.1, 455/41.2; 340/539.1, 539.11
See application file for complete search history.

(56) References Cited

U.S. PATENT DOCUMENTS

| | | | | |
|---|---|---|---|---|
| 4,863,150 | A * | 9/1989 | Hodl et al. | 269/56 |
| 7,578,180 | B2 * | 8/2009 | Lionetti et al. | 73/146 |
| 7,579,946 | B2 * | 8/2009 | Case, Jr. | 340/539.1 |
| 7,697,231 | B2 * | 4/2010 | Ito | 360/75 |
| 2007/0211579 | A1 * | 9/2007 | Yoshimura et al. | 369/7 |

FOREIGN PATENT DOCUMENTS

| | | |
|---|---|---|
| JP | 62-197876 | 9/1987 |
| JP | 05-303551 | 11/1993 |
| JP | 2000-036065 | 2/2000 |
| JP | 2001-023007 | 1/2001 |
| JP | 2003-67676 A | 3/2003 |
| JP | 2006-80773 A | 3/2006 |
| JP | 2006-157422 A | 6/2006 |
| JP | 2006-350516 A | 12/2006 |
| JP | 2008-99236 A | 4/2008 |

OTHER PUBLICATIONS

Japanese Office Action dated Nov. 4, 2009, Japanese Patent Application No. 2008-221473 (with English translation).

* cited by examiner

*Primary Examiner* — Yuwen Pan
(74) *Attorney, Agent, or Firm* — Patterson & Sheridan, LLP

(57) ABSTRACT

According to one embodiment, a wireless communication device includes a housing provided with a first face, a radio-frequency coupler installed in the housing so as to face the first face, a close proximity wireless transfer device configured to execute close proximity wireless transfer with the external device existing within a prescribed wirelessly communicable distance from the radio-frequency coupler, a pressure sensitive sensor configured to measure the pressure applied to the first face near the radio-frequency coupler, a reception data processor configured to process data received by the radio-frequency coupler and the close proximity wireless transfer device, and a controller configured to report to the reception data processor that close proximity wireless transfer is available when the close proximity wireless transfer is available and also a measured value of the pressure sensitive sensor is not smaller than a threshold value.

8 Claims, 11 Drawing Sheets

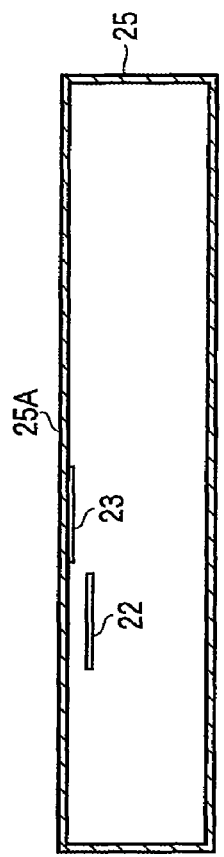
F I G. 3
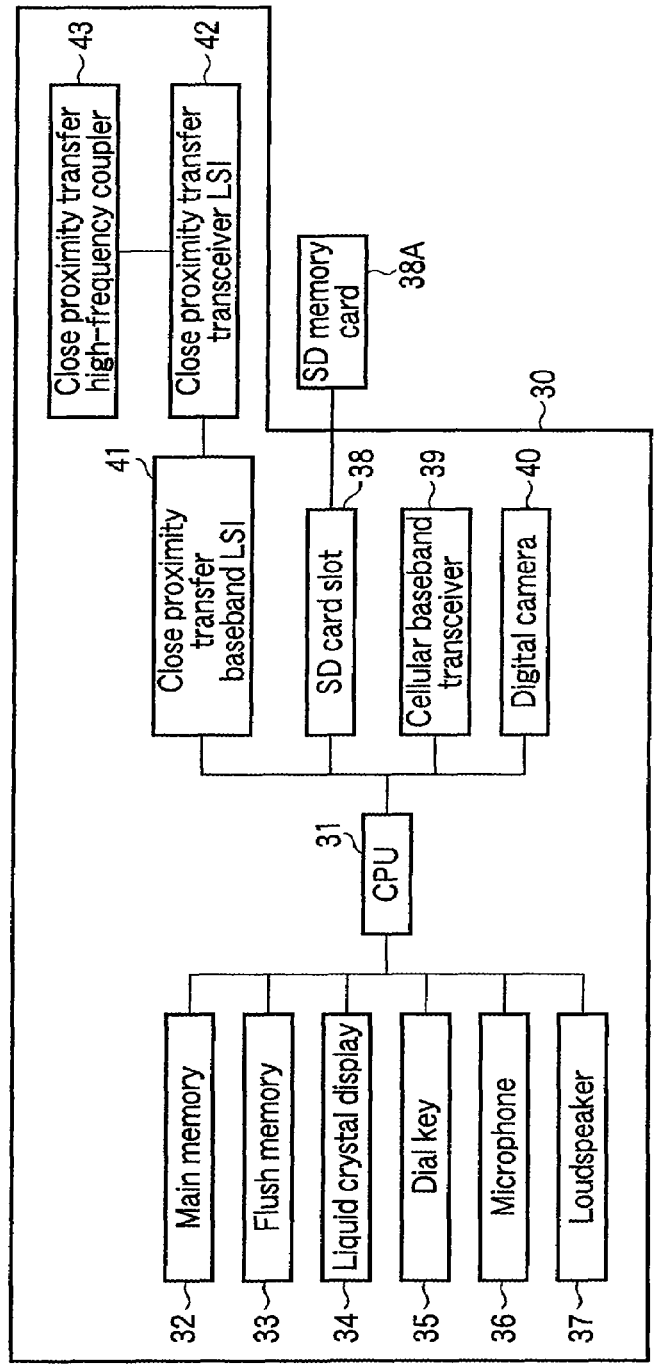
F I G. 4

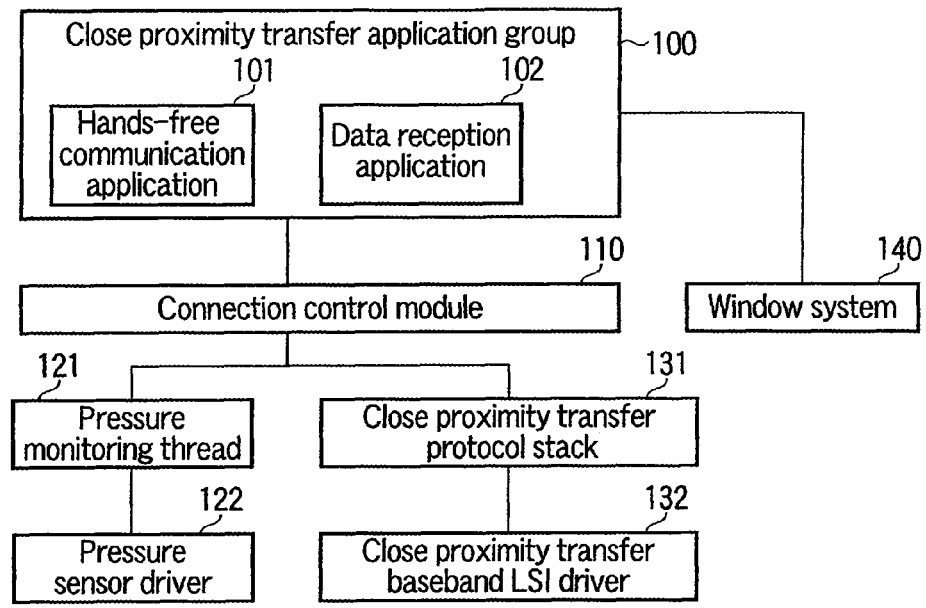
F I G. 5
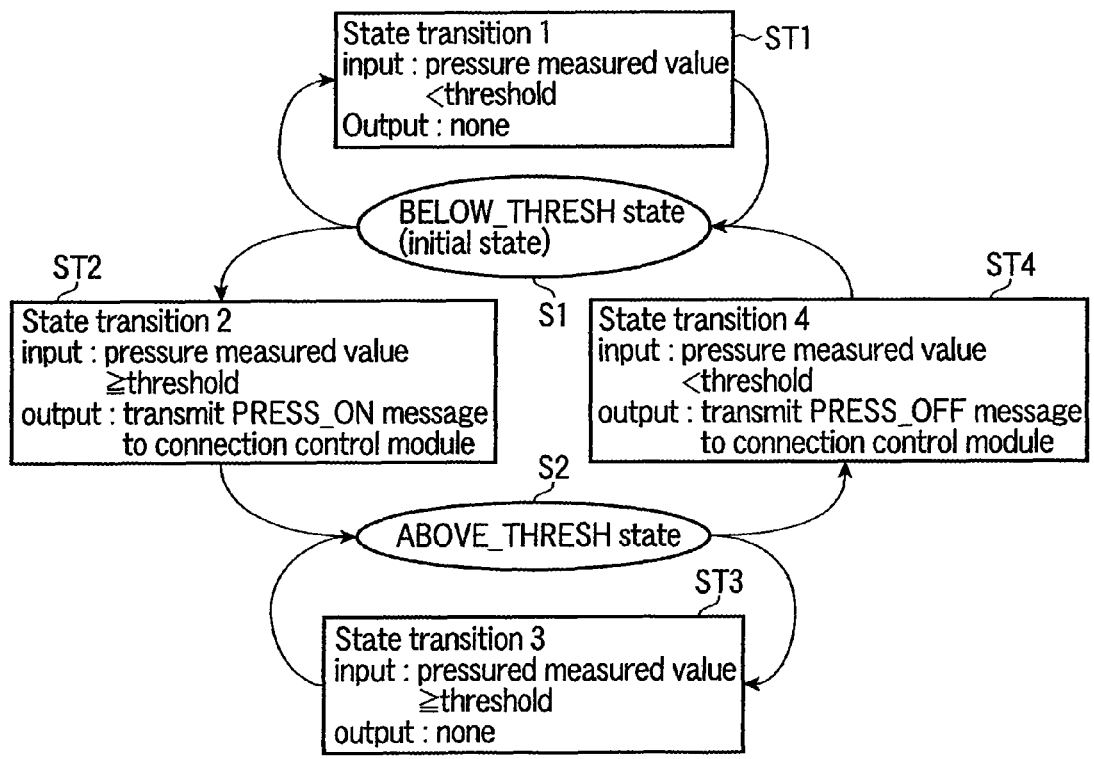
F I G. 6

| Close proximity transfer standby |
|---|
| Press cellular phone to computer |

FIG. 10

| Close proximity transfer alarm |
|---|
| Maintain pressing of cellularphone to computer |

FIG. 11

| Close proximity transfer abnormality |
|---|
| Transfer is interrupted |

FIG. 12

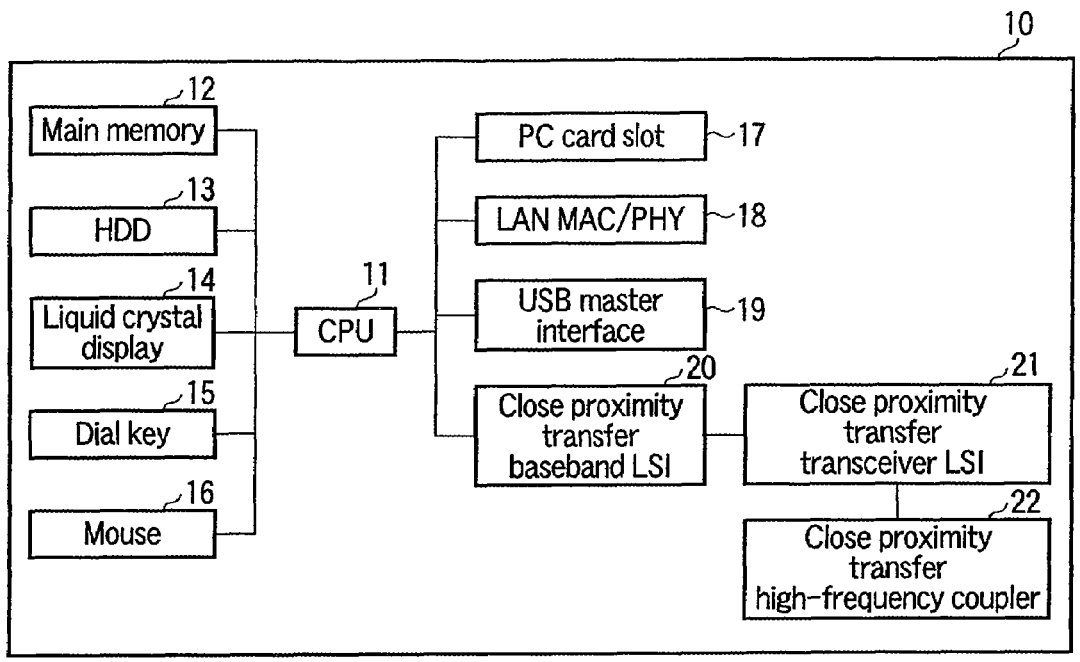
F I G. 14
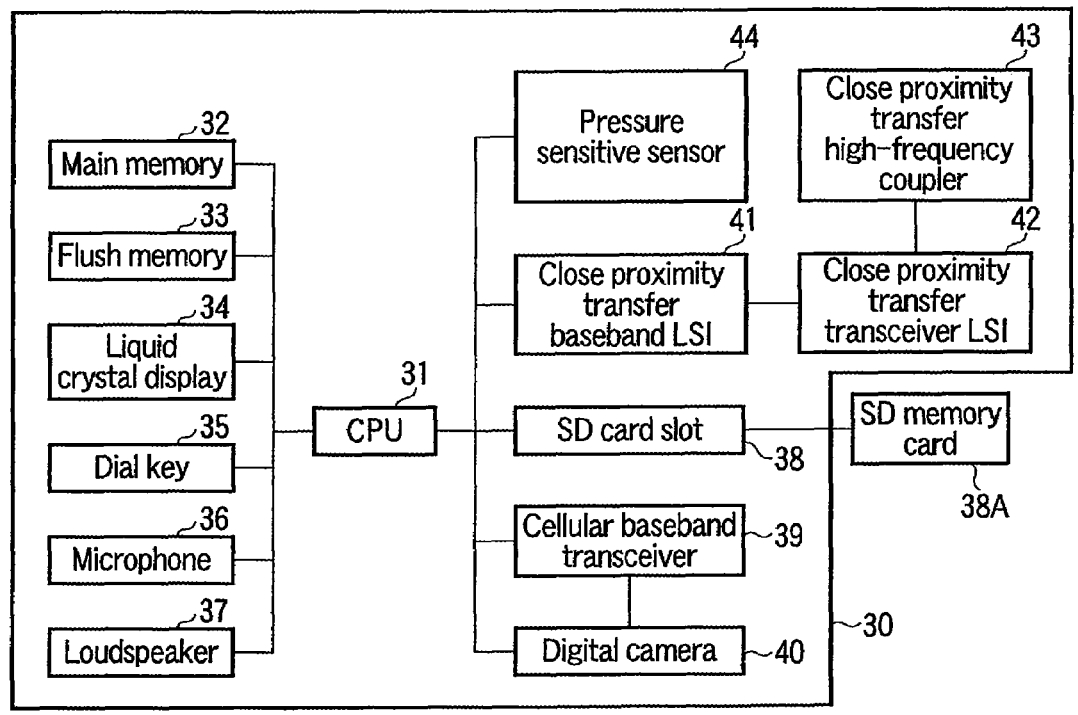
F I G. 15

WIRELESS COMMUNICATION DEVICE

CROSS-REFERENCE TO RELATED APPLICATIONS

This application is based upon and claims the benefit of priority from Japanese Patent Application No. 2008-221473, filed Aug. 29, 2008, the entire contents of which are incorporated herein by reference.

BACKGROUND

1. Field

One embodiment of the invention relates to a wireless communication device which performs close proximity wireless transfer.

2. Description of the Related Art

A close proximity wireless transfer system may communicate among devices when users bring their devices near to each other. Since these operations are intuitive and simple for the users, close proximity wireless transfer is expected to be used widely for cellular phone terminals (See Jpn. Pat. Appln. KOKAI Publication No. 2008-99236).

For making communication via such close proximity wireless transfer system, there is a possibility of interruption of communication if users move their terminal devices accidentally. Or, there may be a possibility of putting the devices in a communication range although the users do not intend to make communication. It is therefore desired to prevent such unexpected communication interruption and unexpected communication start. The technique disclosed in Jpn. Pat. Appln. KOKAI Publication No. 2008-99236 does not take any account of unexpected communication interruptions, etc.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary cross-sectional view depicting an arrangement of a close proximity wireless transfer radio-frequency coupler and a pressure sensitive sensor depicted in FIG. 2;

FIG. 4 is an exemplary block diagram depicting an example of a system configuration of a cellular phone regarding the first embodiment;

FIG. 5 is an exemplary block diagram depicting a software module of a part related to a close proximity wireless transfer of software running on a CPU of the computer depicted in FIG. 1;

FIG. 6 is an exemplary view depicting an example of a state transition of a pressure monitoring thread depicted in FIG. 5;

FIG. 10 is an exemplary view depicting a standby screen displayed on a liquid crystal display of the computer;

FIG. 11 is an exemplary view depicting a warning screen displayed on the liquid crystal display of the computer;

FIG. 12 is an exemplary view depicting an abnormal screen displayed on the liquid crystal display of the computer;

FIG. 14 is an exemplary block diagram depicting a system configuration of a personal computer regarding a second embodiment;

FIG. 15 is an exemplary view depicting an example of a system configuration of a cellular phone as a wireless communication device regarding the second embodiment;

DETAILED DESCRIPTION

Various embodiments according to the invention will be described hereinafter with reference to the accompanying drawings. In general, according to one embodiment of the invention, a wireless communication device comprises a housing provided with a first face, a radio-frequency coupler installed in the housing so as to face the first face, and configured to convert a induction field output from an external device into a radio-frequency signal, or to output a radio-frequency signal as a induction field, a close proximity wireless transfer device installed in the housing, and configured to execute close proximity wireless transfer, via the first face, with the external device existing within a prescribed wirelessly communicable distance from the radio-frequency coupler by performing signal processing of the converted radio-frequency signal or by supplying the radio-frequency signal to the radio-frequency coupler; a pressure sensitive sensor installed in the housing so as to face the first face and configured to measure the pressure applied to the first face near the radio-frequency coupler; a reception data processor configured to process data received by the radio-frequency coupler and the close proximity wireless transfer device; and a controller configured to report to the reception data processor that close proximity wireless transfer is available when the close proximity wireless transfer is available and also a measured value of the pressure sensitive sensor is not smaller than a threshold value.

Embodiments of the invention will be described with reference to the drawings.

First Embodiment

Figure 1:
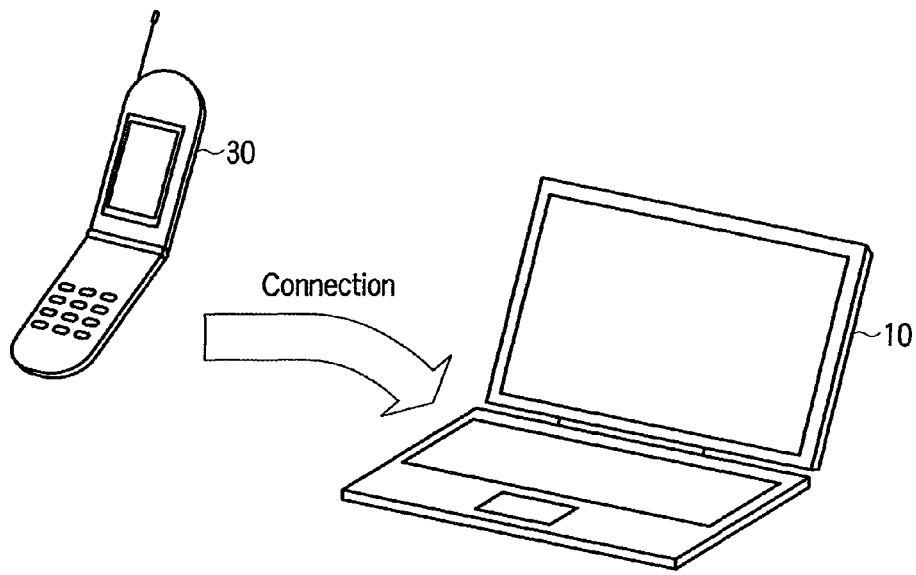
FIG. 1 is an exemplary perspective view depicting an exterior appearance of a notebook personal computer and a cellular phone as wireless communication devices regarding a first embodiment.

FIG. 1 shows a perspective view illustrating an exterior appearance of a notebook personal computer 10 and a cellular phone 30 as wireless communication devices of a first embodiment of the invention.

The computer 10 and the cellular phone 30 execute close proximity wireless transfer. The close proximity wireless transfer between the computer 10 and the cellular phone 30 is executed in a peer-to-peer form. A communication distance is, for example, 3 cm. A wireless connection between the computer 10 and a cellular phone 30 is enabled only when the distance between the computer 10 and the cellular phone 30 is within the communication distance (e.g., 3 cm). When the computer 10 and the cellular phone 30 are within the communicable distance, the connection between the computer 10 and the cellular phone 30 is effected. A data transfer of a data file expressly specified by a user, or a preset synchronization object data file are executed between the computer 10 and the cellular phone 30.

In the close proximity wireless transfer, a induction field is used. As regards a close proximity wireless transfer system, for instance, a communication technique disclosed in Jpn. Pat. Appln. KOKAI Publication No. 2008-99236 may be used. The communication technique disclosed in Jpn. Pat. Appln. KOKAI Publication No. 2008-99236 is a close proximity wireless transfer system using an ultra wideband (UWB), which may achieve a high data transfer rate.

Figure 2:
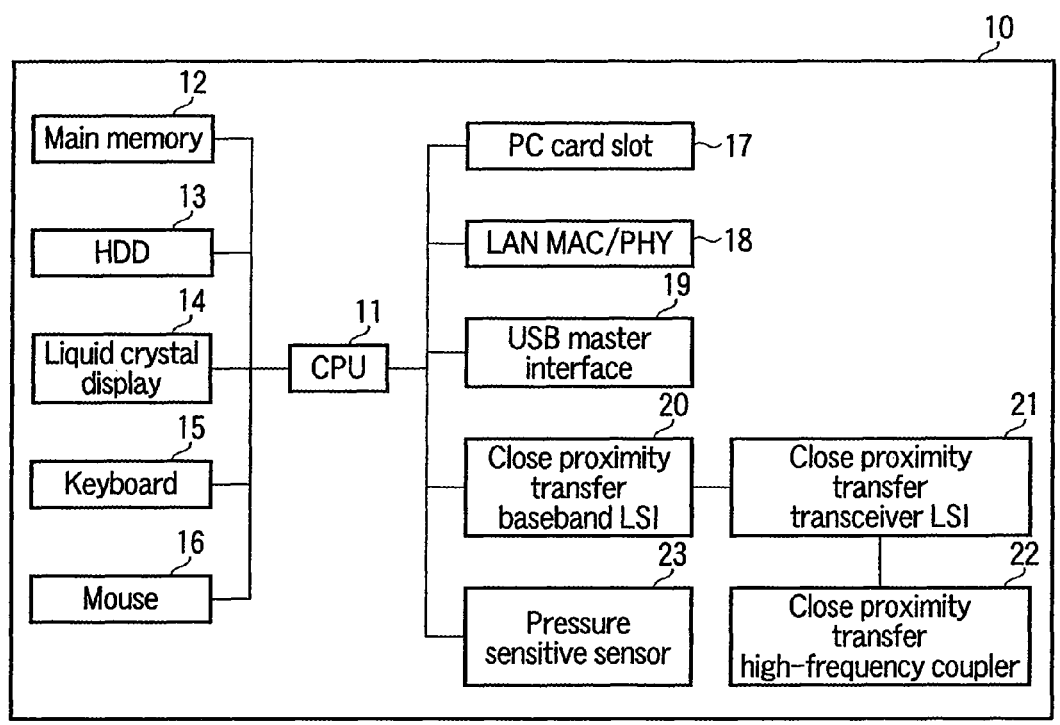
FIG. 2 is an exemplary block diagram depicting a system configuration of the personal computer as the wireless communication device of the first embodiment.

FIG. 2 shows a block diagram illustrating a system configuration of a personal computer 10 as the wireless communication device of the first embodiment of the invention.

As shown in FIG. 2, the computer 10 includes a CPU 11, a main memory 12, a hard disc drive (HDD) 13, a liquid crystal display 14, a keyboard 15, a mouse 16, a PC card slot 17, a LAN MAC/PHY 18, a USB master interface 19, a close proximity wireless transfer baseband LSI 20, a close proximity wireless transfer transceiver LSI 21, a close proximity wireless transfer radio-frequency coupler 22, and a pressure sensitive sensor 23.

The CPU 11 is a processor controlling operations of the computer 10, and executes a variety of application programs such as an operating system (OS) and backup data reception software which is loaded in the main memory 12. Backup data of a data file of a telephone directory and mails, and of an image data file of images photographed by a digital camera 40 are stored in the HDD 13.

A PC card of the PCMCIA standard may be inserted or removed from the card slot 17. The LAN MAC/PHY 18 is a chip for performing communication with another device via a network such as Ethernet (registered trademark).

The baseband LSI 20 is an LSI for performing baseband processing for close proximity wireless transfer. The transceiver LSI 21 is an LSI for performing input/output of radio-frequency signals for close proximity wireless transfer. The coupler 22 is an antenna constituting an electric field coupling for close proximity wireless transfer, and converts the induction field output from the cellular phone 30, or outputs the radio-frequency signal supplied from the transceiver LSI 21. The sensor 23 measures the pressure applied to the vicinity of the coupler 22.

The coupler 22 and the sensor 23 are arranged as shown in FIG. 3.

The computer 10 is provided with a housing 25 accommodating components of the computer 10. The housing 25 includes, as shown in FIG. 2, the CPU 11, main memory 12, HDD 13, liquid crystal display 14, keyboard 15, mouse 16, PC card slot 17, LAN MAC/PHY 18, USB master interface 19, baseband LSI 20, transceiver LSI 21, coupler 22 and sensor 23.

The housing 25 has a first face 25A. The coupler 22 is disposed in the housing 25 so as to face the first face 25A. The coupler 22 is arranged so as to output the induction field through the first face 25A. The sensor 23 is disposed in the housing 25 so as to face the first face 25A. The sensor 23 is arranged so as to measure the pressure applied to the first face 25A near the coupler 22.

The transceiver LSI 21 and the baseband LSI 20 execute close proximity wireless transfer within a prescribed communication distance (e.g., 3 cm) from the coupler 22 through the first face 25A. The first face 25A functions as a communication face to be used for close proximity wireless transfer between the computer 10 and the cellular phone 30. Bringing the communication face of the cellular phone 30 closer to the first face 25A of the computer 10, or bringing the first face 25A of the computer 10 closer to the communication face of the cellular phone 30 makes it possible to start data transfer between the cellular phone 30 and the computer 10.

FIG. 4 shows a block diagram illustrating an example of the system configuration of the cellular phone 30 regarding the first embodiment of the invention.

As shown in FIG. 4, the cellular phone 30 includes a CPU 31, a main memory 32, a flush memory 33, a liquid crystal display 34, a dial key 35, a microphone 36, a loudspeaker 37, an SD card slot 38, a cellular baseband transceiver 39, the digital camera 40, a close proximity wireless transfer baseband LSI 41, a close proximity wireless transfer transceiver LSI 42, and a close proximity wireless transfer radio-frequency coupler 43.

The CPU 31 is a processor controlling operations of the cellular phone 30 and executes various application programs such as an operating system (OS), a mailer, backup data transmission software, which are loaded in the main memory 32.

The flush memory 33 is a storage place of a data file, etc., obtained by the user. For instance, a data file of a telephone directory and mails, and a data file of images photographed with the camera 40 are stored in the flush memory 33.

The dial key 35 is disposed in order to input telephone numbers, or input characters by user's operations.

The card slot 38 is a slot for inserting and removing the SD memory card 38A. The transceiver 39 is a circuit disposed for communicating with a base station.

The baseband LSI 41 is an LSI for conducting baseband signal processing for close proximity wireless transfer. The transceiver LSI 42 is an LSI for conducting input/output of a radio-frequency signal for close proximity wireless transfer. The coupler 43 is an antenna enabling electric field coupling for close proximity wireless transfer, for converting the induction field output from the coupler 22, or outputting a radio-frequency signal supplied from the transceiver LSI 42 as the induction field.

As mentioned earlier, when the user brings the communication face of the cellular phone 30 closer to the first face 25A of the computer 10, or when the user brings the first face 25A of the computer 10 closer to the communication face of the cellular phone 30, data transfer between the cellular phone 30 and the computer 10 may be started.

However, when making close proximity wireless transfer, there is a possibility of interruption of communication if the user moves the device accidentally during communication. There is also a possibility that the users put the devices within the communication range by accident. When intending to perform especially important communication, and to prevent such an unexpected communication interruption or communication start, communication may be performed between the users' devices by the users intentionally pressing their communications devices.

To enable communication by pressing the devices, close proximity wireless transfer is controlled by comparison between a pressure measured value and a threshold value of the coupler 22. Here is a description about the configuration to control the close proximity wireless transfer.

FIG. 5 shows a software module bock diagram of a part related to the close proximity wireless transfer in software running on the CPU 11 of the computer 10 shown in FIG. 1.

A close proximity wireless transfer application group 100 is a set of software modules performing overall control of communication of the close proximity wireless transfer, and is composed, for example, of application modules as follows:

Hands-Free Speech Application 101

The application 101 transfers the voice sound received at the cellular phone 30 to the computer 10 via close proximity wireless transfer to output the voice from a loudspeaker. Thereby, the application 101 makes communication on the cellular phone 30 in a hands-free manner using a microphone and loudspeaker of the computer 10.

Data Reception Application 102

The application 102 receives telephone book data, calendar data and photograph data transmitted from the cellular phone 30 through the close proximity wireless transfer.

A window system 140 is a module for performing processing of a user interface such as a display on the liquid crystal display 14, input processing from the keyboard, and input processing from the mouse 16.

A close proximity wireless transfer baseband LSI driver 132 performs device I/O control to and from the baseband LSI 20.

A close proximity wireless transfer protocol stack 131 is a module executing communication protocol processing in close proximity wireless transfer to and from a partner's device through the baseband LSI 20. In the embodiment, a communication protocol defined as "IrOBEX version 1.3" is installed, which is used in the data reception application 102. A communication protocol defined in "USB hands-free interface version 1.2.1" is installed, which is used in the hands-free communication application 101.

A pressure sensitive sensor driver 122 is a driver module conducting device I/O control to and from the pressure sensitive sensor 23.

A pressure monitoring thread 121 is a module monitoring input data from the sensor driver 122 to report state changes to a connection control module 110.

The control module 110 is a module controlling the start and the end of the communication between the computer 10 and the cellular phone 30 on the basis of the information from the monitoring thread 121 and from the protocol stack 131.

Event messages are communicated between the monitoring thread 121 and the control module 110. There are three kinds of event message, as follows:

1. PRESS_ON message: an event message reporting that a pressure measured value is made larger than a threshold from the pressure monitoring thread to the connection control module.

2. PRESS_OFF message: an event message reporting that the pressure measured value is made smaller than the threshold from the pressure monitoring thread to the connection control module.

3. THRESH_CHANGE message: an event message reporting of a change in threshold from the connection control module to the pressure monitoring thread.

Event messages make communication between the monitoring thread 121 and the control module 110. There are three kinds of event message, as follows:

1. CONNECT_ON message: an event message reporting of establishment of radio-frequency coupling to a partner's device from the communication protocol stack 131 to the connection control module.

2. CONNECT_OFF message: an event message reporting interruption of the radio-frequency coupling with the partner's device from the communication protocol stack 131 to the connection control module.

The connection control module 110 performs communication with the application modules 101, 102 through the event messages described as follows:

START message: an event message reporting that a state is brought into a communicable state from the connection control module 110 to the application modules 101, 102.

2. STOP message: an event message reporting that the state is brought into incommunicable state from the connection control module to the application module.

3. THRESH_CHANGE message: an event message reporting a change in threshold from the application modules 101, 102 to the connection control module 110.

Upon activation, each application module 101, 102 transmits the "THRESH_CHANGE" event message to the connection control module 110. A specific threshold is described as a parameter in the "THRESH_CHANGE" event message for each application 101, 102.

For instance, in the case of the hands-free communication application 101, voice data is transmitted and received through the close proximity wireless transfer, since a slight interruption of voice data is not a fatal fault; a value "0" is described as the threshold.

Conversely, in the case of the data reception application 102, since relatively important data such as telephone book data and calendar data are transmitted and received via close proximity wireless transfer, a relatively large value (e.g., 1 kgf) is described as the threshold.

When receiving the THRESH_CHANGE event message from the application modules 101, 102, the connection control module 110 transfers the event message to the pressure monitoring thread 121. When receiving the THRESH_CHANGE event message from the connection control module 110, the pressure monitoring thread 121 stores the threshold described in the event message in a memory.

FIG. 6 shows an example of a state transmission of the pressure monitoring thread 121. The two states of the monitoring thread 121 are:

1. BELOW_THRESH state: a state of pressure smaller than the threshold (an initial state).

2. ABOVE_THRESH state: a state of pressure not smaller than the threshold.

The monitoring thread 121 reads the measured value of the pressure sensitive sensor 23 at prescribed intervals (e.g., 0.1 sec) to conduct a state transition in response to the read values. An example of the state transition of the monitoring thread 121 is described as follows:

1. State transition 1 (ST1): in a BELOW_THRESH state (S1), if the pressure measured value is smaller than the threshold, the monitoring thread 121 stays in the State transition 1 (S1).

2. State transition 2 (ST2): in the BELOW_THRESH state (S1), if the pressure measured value is not smaller than the threshold, the monitoring thread 121 transmits the "PRESS_ON" message to the control module 110 to transit to the "ABOVE THRESH" state (S2).

3. State transition 3 (ST3): in the ABOVE THRESH state (S2), if the pressure measured value is not smaller than the threshold, the monitoring thread 121 stays in the ABOVE THRESH state (S2).

4. State transition 4 (ST4): in the ABOVE THRESH state (S2), if the pressure measured value is smaller than the threshold, the monitoring thread 121 transmits the PRESS_OFF message to the control module 110 to transit to the BELOW_THRESH state (S1).

Figure 7:
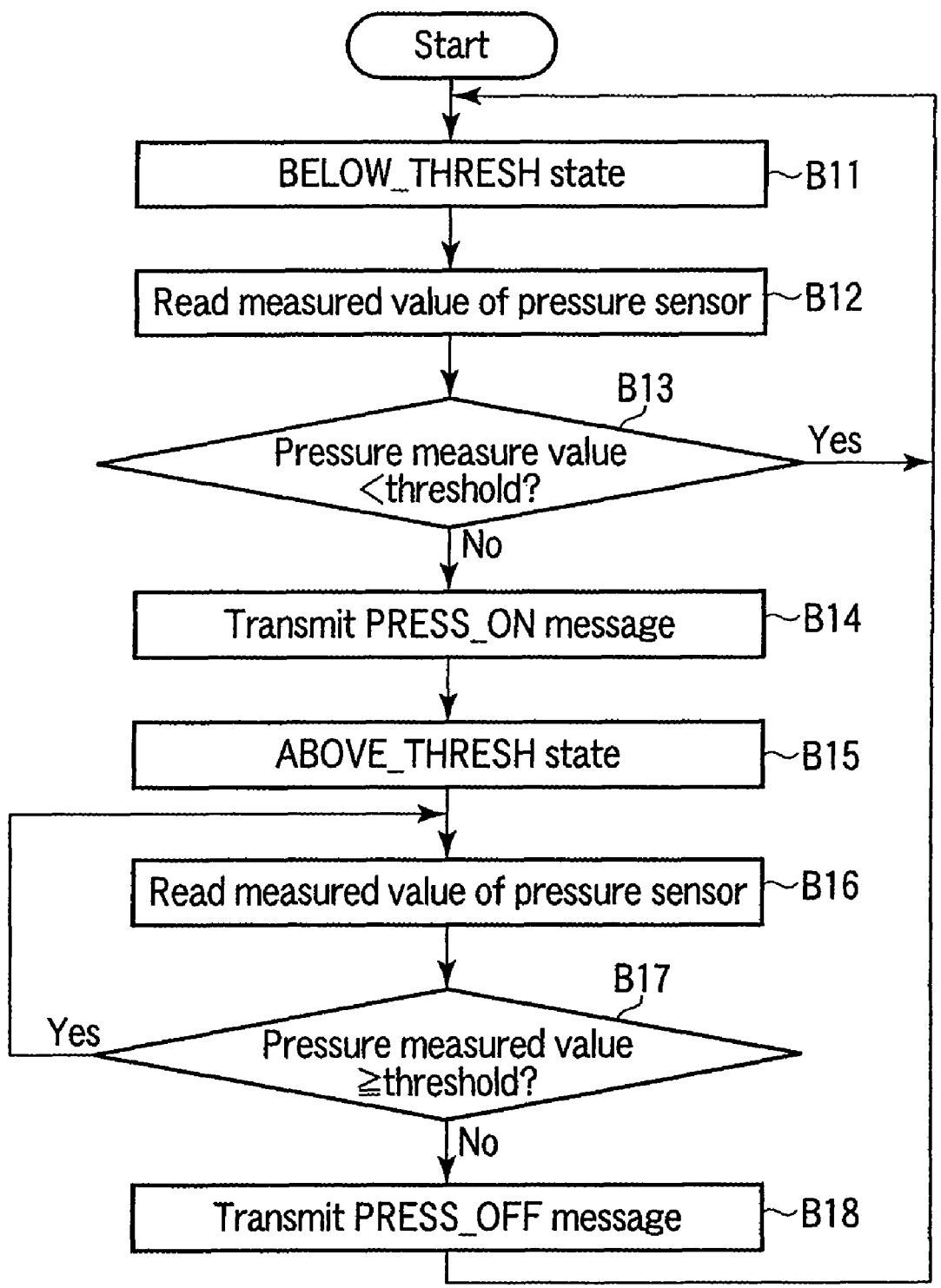
FIG. 7 is an exemplary flowchart depicting a procedure of processing to be executed by the pressure monitoring thread.

The procedure in the processing to be executed by the monitoring thread 121 will be described by referring to the flowchart of FIG. 7.

Firstly, the pressure monitoring thread 121 is in the BELOW_THRESH state (S1) (Block B11). The thread 121 reads the measured value from the pressure sensitive sensor 23 through the pressure sensitive sensor driver 122 (Block B12). The thread 121 determines whether or not the read pressure measured value is smaller than the threshold (Block B13).

If the measured value is smaller than the threshold (Yes, Block B13), the state of the thread 121 stays in the BELOW_THRESH state (S1). If the measured value is not smaller than the threshold (No, Block B13), the thread 121 transmits the PRESS_ON message to the connection control module 110 (Block B14). The thread 121 then transits to the ABOVE_THRESH state (S2) (Block B15).

After a prescribed time interval, the thread 121 reads the measured value from the pressure sensitive sensor 23 through the pressure sensitive sensor driver 122 (Block B16). The thread 121 determines whether or not the read pressure measured value is not smaller than the threshold (Block B17). If the measured value is not smaller than the threshold (Yes, Block B17), the state of the thread 121 stays in the ABOVE_THRESH state (S2). If the measured value is not larger than the threshold (No, Block B17), the thread 121 transmits a PROCESS_OFF message to the control module 110 (Block B18). The thread 121 then transits into the ABOVE_THRESH state (S2) (Block B11).

When being brought into a state which is communicable with the cellular phone 30 through the close proximity wireless transfer, the communication protocol stack 131 transmits a CONNECT_ON message to the control module 110. After transmitting the CONNECT_ON message to the control module 110, when being brought into a state which is incommunicable with the cellular phone 30 through the close proximity wireless transfer, the communication protocol stack 131 transmits the CONNECT_OFF message to the control module 110.

Figure 8:
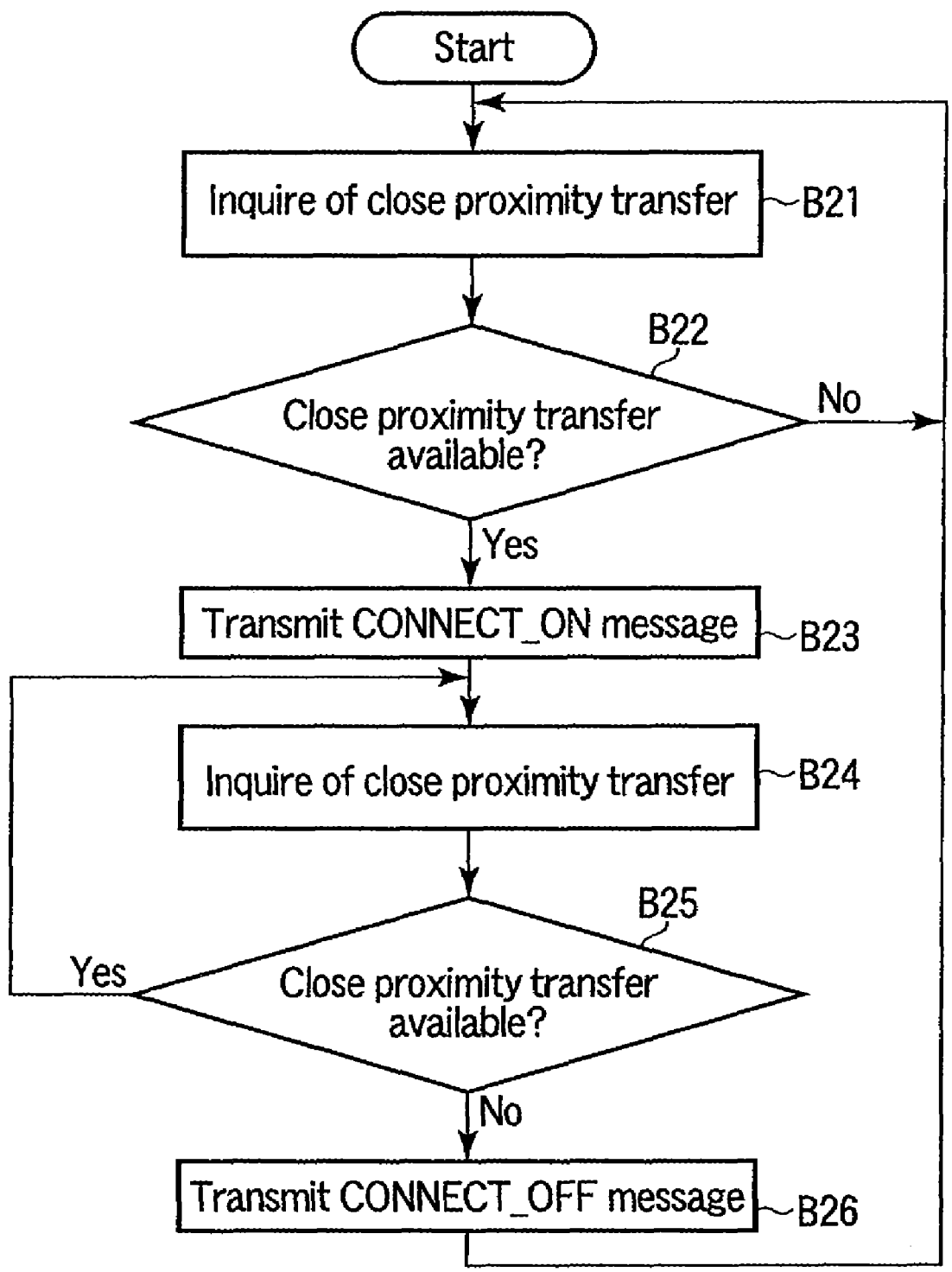
FIG. 8 is an exemplary flowchart depicting a procedure of processing to be executed by a communication protocol stack depicted in FIG. 5.

Referring now to FIG. 8, the procedure of the processing to be executed by the communication protocol stack 131 will be explained. The stack 131 inquires whether close proximity wireless transfer is available or not to the close proximity wireless transfer baseband LSI driver 132 (Block B21). When the result corresponding to the inquiry is returned, the stack 131 refers to the result and determines whether or not the close proximity wireless transfer is available (Block B22).

If it is determined that the communication is not available (no, Block B22), after a prescribed time period from the inquiry, the stack 131 inquires whether or not the close proximity wireless transfer is available to the LSI driver 132 (Block B21) to determine whether the close proximity wireless transfer is available or not (Block B22).

If it is determined that the communication is available (Yes, Block B22), the stack 131 transmits the CONNECT_ON message to the control module 110 (Block B23).

After a fixed time period has elapsed since the inquiry, the communication protocol stack 131 inquires again whether or not the close proximity wireless transfer is available to the LSI driver 132 (Block B24) to determine whether or not the close proximity wireless transfer is available (Block B25).

If it is determined that communication is available (Yes, Block B25), when the fixed time period has elapsed after the inquiry, the stack 131 inquires again whether or not the close proximity wireless transfer is available to the LSI driver 132 (Block B24) to determine whether or not the close proximity wireless transfer is available (Block B25).

If it is determined that the communication is not available (No, Block B25), the stack 131 transmits the CONNECT_OFF message to the control module 110 (Block B26).

Figure 9:
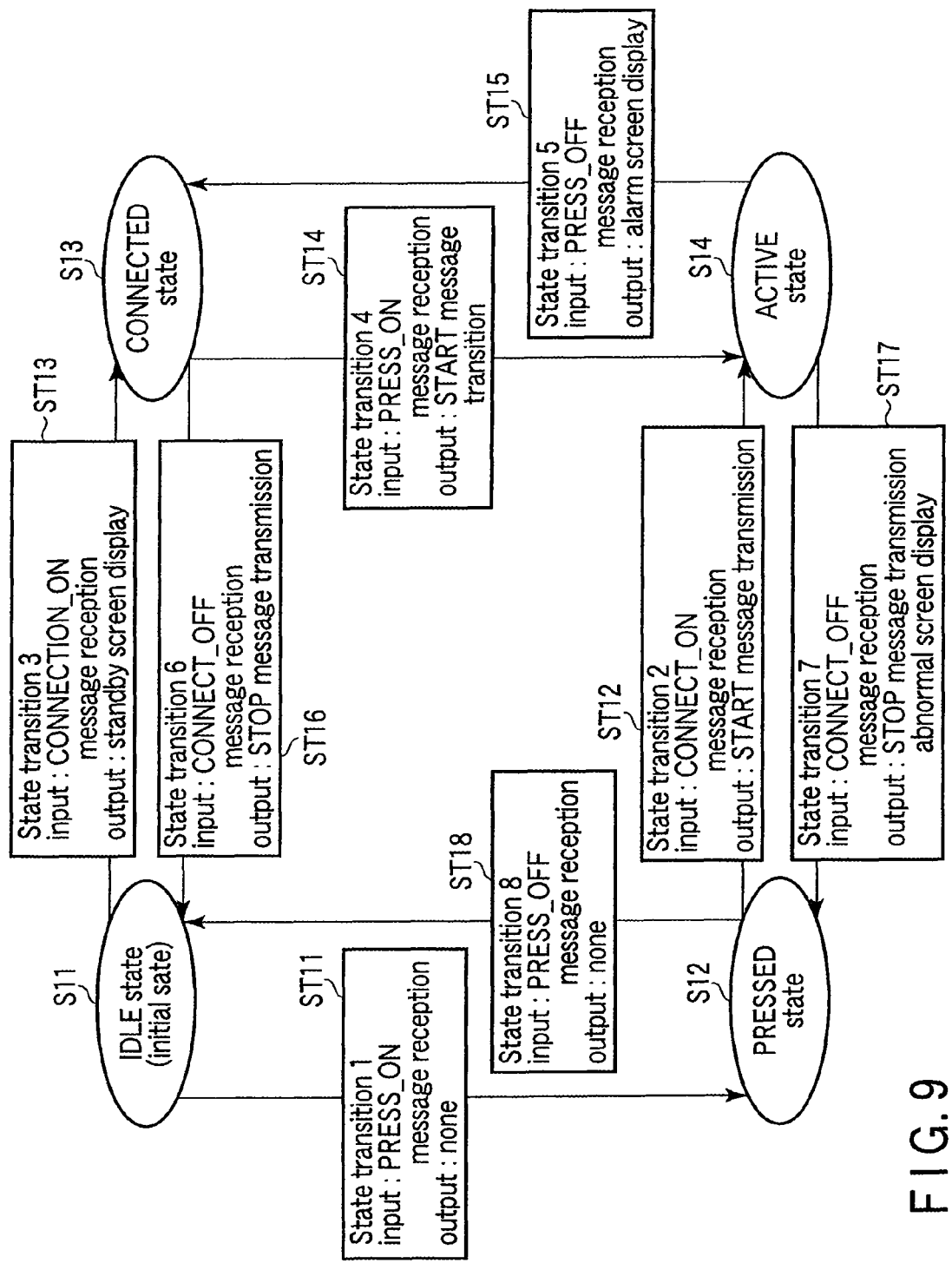
FIG. 9 is an exemplary view depicting an example of a state transition of a connection control module depicted in FIG. 5.

The state and the state transition of the connection control module 110 will be described hereinafter. FIG. 9 shows an example of the state transition of the control module 110. The four states of the connection control module 110 are:

1. IDLE state (S11): a state in which nothing happens (an initial state)
2. PRESSED state (S12): a state where pressure has been applied, but radio-frequency coupling has not been effected.
3. CONNECTED state (S13): a state where the radio-frequency coupling has been effected, but no pressure has been applied.
4. ACTIVE state (14): a state where radio-frequency coupling has been effected, and pressure has been applied.

The control module 110 implements a state transition described as follows:

State transition 1 (ST11): in the IDLE state (S11), when receiving the PRESS_ON event message from the pressure monitoring thread 121, the control module 110 transits into the PRESSED state (S12)

State transition 2 (ST12): in the PRESSED state (S12), when receiving the CONNECT_ON message from the stack 131, the control module 110 transmits the START event message to the application to transit into the ACTIVE state (S13)

State transition 3 (ST13): in the IDLE state (S11), when receiving the CONNECT_ON event message from the stack 131, the control module 110 executes processing to display the standby screen shown in FIG. 10 on the liquid crystal display 14 and then transits into the CONNECTED state (S14)

State transition 4 (ST14): in the CONNECTED state (S14), when receiving the PRESS_ON message from the thread 121, the control module 110 transmits the START event message to the application to transit into the ACTIVE state (S13)

State transition 5 (ST15): in the ACTIVE state (S13), when receiving the PRESS_OFF message from the thread 121, the control module 110 displays a warning screen (FIG. 11) on the window system 140 and also issues a warning sound to transit into the CONNECTED state (S14)

State transition 6 (ST16): in the CONNECTED state (S14), when receiving the CONNECT_OFF message from the stack 131, the control module 110 transmits the STOP message to the application module and then transits into the IDLE state (S11)

State transition 7 (ST17): in the ACTIVE state (S13), when receiving the CONNECT_OFF message from the stack 131, the control module 110 displays the abnormal screen (FIG. 12) on the window system 140, also issues the warning sound, and transmits the STOP message to the application module and then transits into the PRESSED state (S12)

State transition 8 (ST18): in the PRESSED state (S12), when receiving the PRESS_OFF message from the thread 121, the control module 110 transits into the IDLE state (S11).

Figure 13:
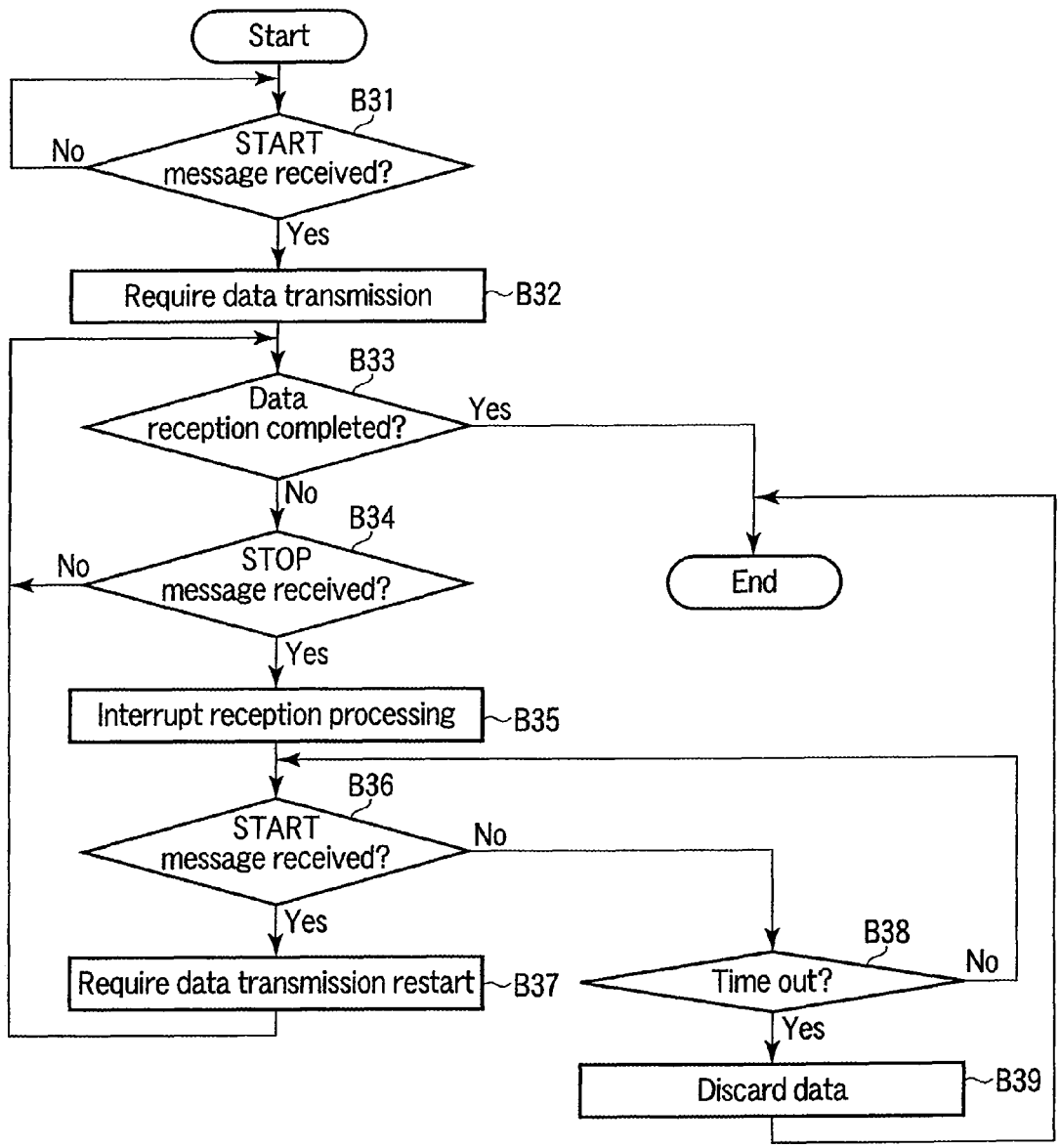
FIG. 13 is an exemplary flowchart depicting a procedure of processing executed by a data reception application depicted in FIG. 5.

The processing to be conducted by the data reception application 102 in response to the START message and the STOP message transmitted from the control module 110 will be described. Next is a description of the procedure of the processing to be executed by the data reception application 102, with reference to the flowchart of FIG. 13.

Firstly, the data reception application 102 determines whether or not the START message has been received from the connection control module 110 (Block B31). If it is determined that the START message has not been received (No, Block B31), the application 102 periodically executes the processing in Block B31.

If it is determined that the START message has been received (Yes, Block B31), the application 102 requests the cellular phone 30 to transmit the data of the data file of the telephone directory and e-mails, and of the data file of the images photographed with the digital camera 40 (Block B32).

After receiving the data, the application 102 periodically determines whether or not data reception has completed (Block B33). If it is determined that the data reception has completed (Yes, Block B33), the application 102 ends the processing.

If it is determined that the data reception has not completed (No, Block B33), the application 102 then awaits reception of the STOP message (Block B34). If it is determined that the STOP message has not been received (No, Block B34), the application 102 periodically executes the processing in Blocks B33 and B34.

If it is determined that the STOP message has been received (Yes, Block B34), the application 102 interrupts the processing of the data reception (Block B35). The application 102 then determines whether or not the START message has been received (Block B36). If it is determined that the START message has not been received (No, Block B36), the application 102 determines whether or not a fixed time period has elapsed after the reception of the STOP message (Block B38). If it is determined that the fixed time period has elapsed (Yes, Block B38), the application 102 discards the data received so far (Block B39) and ends the processing. If it is determined that the fixed time period has not elapsed (No, Block B38), the application 102 periodically executes the processing of Block B36.

If it is determined that the START message has been received in Block B36 (Yes, Block B36), the application 102 requests the cellular phone 30 to transmit the data after the data which has been received successfully (Block B37). The application 102 periodically executes the processing in Block B33.

By the above processing, when intending to perform especially important communication, and to prevent an unexpected communication interruption or communication start, communication may be performed between the users' devices by the users intentionally pressing their communications devices.

Second Embodiment

While the first embodiment has described the case in which the pressure sensitive sensor is disposed on a device side to receive the data, an example of a second embodiment in which the pressure sensitive sensor is disposed on a device side to transmit the data will be described hereinafter.

FIG. 14 shows a block diagram illustrating a system configuration of the personal computer 10 regarding the second embodiment of the invention.

As shown in FIG. 14, the computer 10 includes the CPU 11, main memory 12, HDD 13, liquid crystal display 14, keyboard 15, mouse 16, PC card slot 17, LAN MAC/PHY 18, USB master interface 19, close proximity wireless transfer baseband LSI 20, close proximity wireless transfer transceiver LSI 21, and close proximity wireless transfer radio-frequency coupler 22. The same components as those of FIG. 2 are designated by identical symbols and the description thereof will be omitted.

FIG. 15 shows a view illustrating an example of the system configuration of the cellular phone 30 as a wireless communication device in the second embodiment of the invention.

As shown in FIG. 15, the cellular phone 30 includes the CPU 31, main memory 32, flush memory 33, liquid crystal display 34, dial key 35, microphone 36, loudspeaker 37, SD card slot 38, cellular baseband transceiver 39, digital camera 40, close proximity wireless transfer baseband LSI 41, close proximity wireless transfer transceiver LSI 42, close proximity wireless transfer radio-frequency coupler 43, and a pressure sensitive sensor 44. The same components as those of FIG. 4 will be designated by identical symbols and the description thereof will be omitted. The pressure sensitive sensor 44 measures the pressure applied near the coupler 43.

Figure 16:
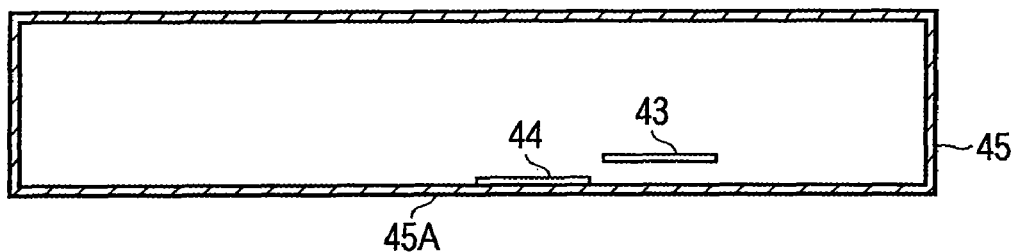
FIG. 16 is an exemplary cross-sectional view depicting an arrangement of a close proximity wireless transfer radio-frequency coupler and a pressure sensitive sensor depicted in FIG. 15.

The radio-frequency coupler 43 and the pressure sensitive sensor 44 are arranged as shown in FIG. 16.

The cellular phone 30 is provided with a housing 45 accommodating the components of the cellular phone 30. The housing 45 includes the CPU 31, main memory 32, flush memory 33, liquid crystal display 34, dial key 35, microphone 36, loudspeaker 37, SD card slot 38, cellular baseband transceiver 39, digital camera 40, close proximity wireless transfer baseband LSI 41, close proximity wireless transfer transceiver LSI 42, close proximity wireless transfer radio-frequency coupler 43, and pressure sensitive sensor 44, which are shown in FIG. 15.

The housing 45 includes a first face 45A. The coupler 43 is accommodated in the housing 45 so as to face the first face 45A. The coupler 43 is arranged so as to output a induction field through the first face 45A. The pressure sensitive sensor 44 is accommodated in the housing 45 so as to face the first face 45A. The pressure sensitive sensor 44 is arranged so as to measure the pressure applied to the first face 45A near the coupler 43.

Figure 17:
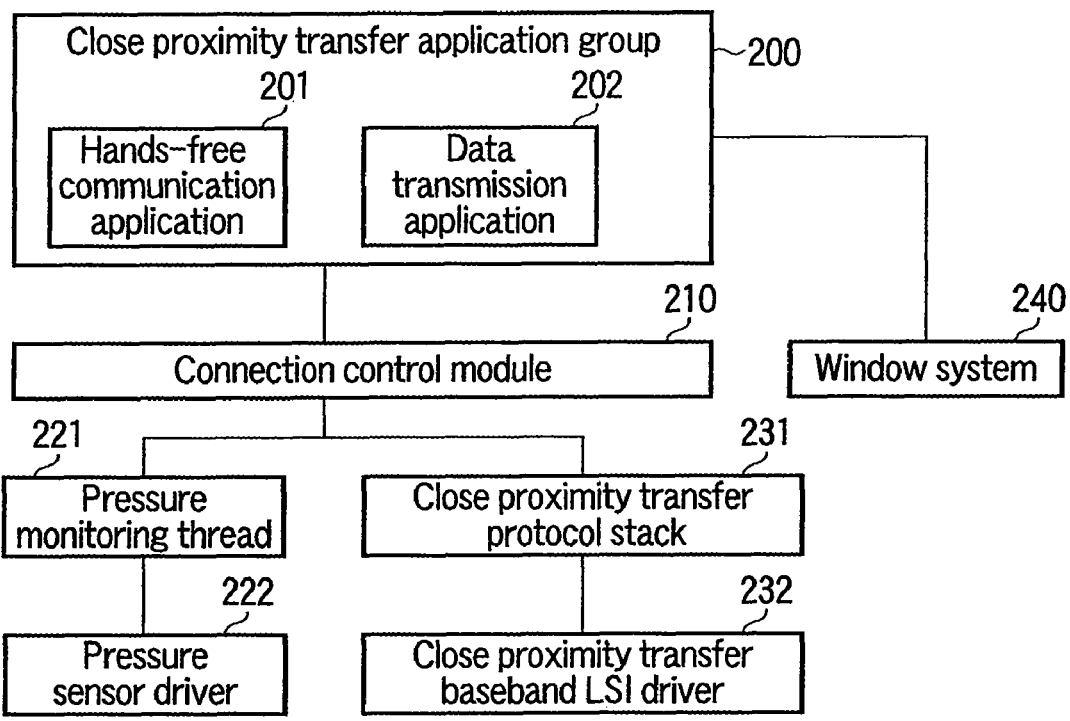
FIG. 17 is an exemplary block diagram depicting a software module of a part related to close proximity wireless transfer of software running on a CPU of a cellular phone depicted in FIG. 15.

FIG. 17 is a software module block diagram of a part related to close proximity wireless transfer of the software running on the CPU 31 of the cellular phone 30 shown in FIG. 15.

The close proximity wireless transfer application group 200 is a set of software executing the overall control of the communication through close proximity wireless transfer, and is composed, for example, of the application modules as follows:

Hands-Free Speech Application 201

The application 201 transfers the voice sound received at the cellular phone 30 to the computer 10 via close proximity wireless transfer to output the voice from a loudspeaker.

Data Reception Application 202

The application 202 transmits telephone book data, calendar data and photograph data stored in the cellular phone 30.

A window system 240 is a module for display on the liquid crystal display 34, input processing from the dial key 35, and processing of a user interface.

A close proximity wireless transfer baseband LSI driver 232 is a driver module to perform I/O device control to and from the baseband LSI 41.

A close proximity wireless transfer protocol stack 231 is a module to execute communication protocol processing of the close proximity wireless transfer to and from through the partner's device.

A pressure sensitive sensor driver 222 is a driver module to execute device I/O control to and from the pressure sensitive sensor 44.

A pressure monitoring thread 221 is a module monitoring input data from the pressure sensitive sensor driver 222 to report a state change to the connection control module.

A connection control module 210 is a module controlling start and end of communication between the computer 10 and the cellular phone 30.

Communication is performed between the monitoring thread 221 and the control module 210 through event messages. The event messages include the same three kinds as those of the event messages to be exchanged between the pressure monitoring thread 121 and the connection control module 110 as described in the first embodiment.

The event messages to be exchanged between the communication protocol stack 231 and the control module 210 include the same two kinds as those of the event messages to be exchanged between the communication protocol stack 231 and the connection control module 110 as described in the first embodiment.

The control module 210 and the application modules 201, 202 make communication through the same event messages as those between the control module 110 and the application module as described in the first embodiment.

Upon activation, each application module 201, 202 transmits a THRESH_CHANGE event message to the control module 210. A specific threshold is described as a parameter in the THRESH_CHANGE event message for each application 201, 202.

For instance, in a case of the hands-free communication application 201, voice data is transmitted and received through close proximity wireless transfer and since momentary interruption of the voice data does not pose a serious fault, a value of "0" is posted as a threshold.

Meanwhile, in a case of the data transmission application 202, since relatively important data such as the telephone directory data and calendar may be transmitted and received through close proximity wireless transfer, a relatively large value (e.g., 1 kgf) is posted as the threshold.

The monitoring thread 221 performs the state transition to and from the state transition of the pressure monitoring thread 121 described in the first embodiment. The monitoring thread 221 includes the same two states as those of the monitoring thread 121 described in the first embodiment.

The procedure of the processing of the pressure monitoring thread 221 is the same as that of the processing of the pressure monitoring thread 121 described with reference to the flowchart of FIG. 7.

The procedure of the processing to be executed by the protocol stack 231 is the same as that of the processing to be executed by the protocol stack 131 described with reference to the flowchart of FIG. 8.

The state and the state transition of the control module 110 are the same as those of the example of the control module 110 described with reference to FIG. 9. The connection control module 210 includes the same four states as those of the control module 110.

Figure 18:
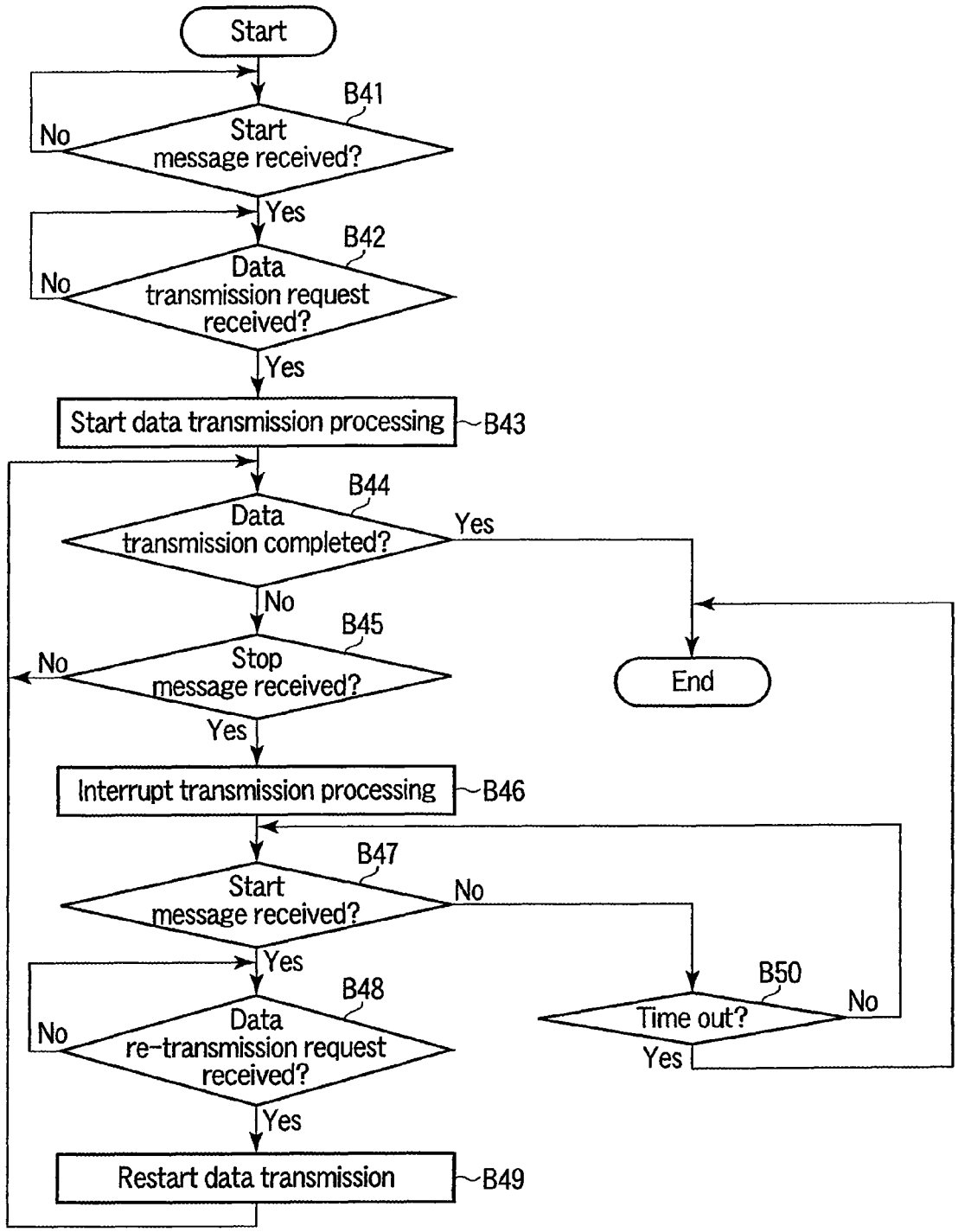
FIG. 18 is an exemplary flowchart depicting a procedure of processing executed by a data transmission application depicted in FIG. 17.

The processing to be performed by the data transmission application 202 in response to the START message and the STOP message to be transmitted from the control module 210 will be explained hereinafter. The procedure of the processing to be conducted by the data transmission application 202 will be described with reference to the flowchart of FIG. 18.

The transmission application 202 firstly determines whether or not the START message has been received from the control module 110 (Block B41). If it is determined that the START message has not been received (No, Block B41), the transmission application 202 periodically executes the processing of Block B41.

If it is determined that the START message has been received (Yes, Block B41), the transmission application 202 determines whether or not the transmission of data of data files of a telephone directory and e-mails and of a data file of images photographed with the digital camera 40 has been required from the computer 10 (Block B42).

If it is determined that the START message has not been received (No, Block 42), the transmission application 202 periodically executes the processing in Block B42. If it is determined that the START message has been received (Yes, Block B42), the transmission application 202 starts transmission processing of a transmission of data of data files of the telephone directory and e-mails and of a data file of images photographed by the digital camera 40 (Block B43). After receiving the START message (Yes, Block B41) without confirmation of the reception of the data transmission request, the transmission application 202 may automatically start the transmission processing of the data of the data file of the telephone directory and e-mails and of the data file of the images photographed by the digital camera 40.

After starting the transmission of the data, the transmission application 202 periodically determines whether or not the transmission of the data has completed (Block B44). If it is determined that the reception of the data has completed (Yes, Block B44), the transmission application 202 ends the processing.

If it is determined that the reception of the data has not been completed (No, Block B44), the transmission application 202 then determines whether or not the STOP message has been received (Block B45). If it is determined that the STOP message has not been received (No, Block B45), the transmission application 202 periodically executes the processing of Blocks B44 and B45.

If it is determined that the STOP message has been received (Yes, Block B45), the transmission application 202 interrupts the transmission processing of the data (Block B46). The transmission application 202 then determines whether or not the START message has been received (Block B47). If it is determined that the START message has not been received (No, Block B47), the transmission application 202 determines whether or not a fixed time period has elapsed after the reception of the STOP message (Block B50). If it is determined that the fixed time period has elapsed (Yes, Block B50), the transmission application 202 ends the processing. If it is determined that the fixed time has not elapsed (No, Block B50), the transmission application 202 periodically executes the processing of Block B47.

In Block B47, if it is determined that the START message has been received (Yes, Block B47), the transmission application 202 determines whether or not a re-transmission request for the data from the cellular phone 30 has been received (Block B48). If it is determined that the re-transmission request for the data has been received (Yes, Block B48), the transmission processing of the data corresponding to the re-transmission request is restarted (Block B49). Here, since the computer 10 has received a part of items of the data, information showing the finally received data is included in the re-transmission request. The transmission application 202 transmits the data after the last data. Further, the reception of the re-transmission request may not be confirmed. In this case, if it is determined that the START message has been received (Yes, Block B47), the transmission application 202 re-transmits from the first data of the data to be transmitted even if the data has already been transmitted. After the start of the re-transmission, the transmission application periodically executes the processing of Block B44.

In the above processing, when intending to perform especially important communication, and to prevent an unexpected communication interruption or communication start, communication may be performed between the users' devices by the users intentionally pressing their communications devices.

When receiving the START message from the connection control module, the application module starts the communication. When receiving the STOP message, the application module stops the communication.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A wireless communication device comprising:
a housing comprising a first face;
a coupler in the housing so as to face the first face;
a close proximity wireless transfer device configured to execute close proximity wireless transfer, via the first face, with an external device using the coupler;
a pressure sensitive sensor configured to measure the pressure applied to the first face near the coupler;
a data processor configured to process data received by the coupler and the close proximity wireless transfer device; and
a controller configured to report to the data processor that close proximity wireless transfer is available when the close proximity wireless transfer is available and also a measured value of the pressure sensitive sensor is not smaller than a threshold value and to report to a user that the pressure sensitive sensor becomes smaller than the threshold value when the measured value from the pressure sensitive sensor becomes smaller than the threshold value after the reporting the received data is available to be processed.

2. The device of claim 1, wherein the data processor is configured to report the threshold value to the controller.

3. The device of claim 1, wherein
the data processor is configured to make a request for a transmission of the data to the external device, and performs processing of data transmitted in response to the request in a case in which the controller has reported that the data is receivable.

4. The device of claim 3, wherein
the controller is configured to report to the data processor that the close proximity wireless transfer is unavailable when the close proximity wireless transfer has become unavailable by the coupler and the close proximity wireless transfer device after reporting that the data is receivable, and to report again to the data processor that the close proximity wireless transfer is available in a case in which the close proximity wireless transfer has become available and a measured value from the pressure sensitive sensor becomes not smaller than a threshold value after reporting that the close proximity wireless transfer is unavailable; and
the data processor is configured to interrupt processing of the data when it is reported that the close proximity wireless transfer is unavailable, and makes a request again to the external device for a transmission of the data when it is reported again that the close proximity wireless transfer is available.

5. A wireless communication device comprising:
a housing comprising a first face:
a coupler in the housing so as to face the first face;
a close proximity wireless transfer device configured to execute close proximity wireless transfer, via the first face, with an external device using the coupler;
a pressure sensitive sensor configured to measure the pressure applied to the first face near by the coupler;
a data processor configured to execute processing for transmitting data to the external device by using the coupler and the close proximity wireless transfer device; and
a controller configured to report to the data processor that close proximity wireless transfer is available when the close proximity wireless transfer is available and also a measured value of the pressure sensitive sensor is not smaller than a threshold value, and to report to a user that the pressure sensitive sensor becomes smaller than the threshold value when the measured value from the pressure sensitive sensor become smaller than the threshold value after the reporting the received data is available to be processed.

6. The device of claim 5, wherein
the data processor is configured to report the threshold value to the controller.

7. The device of claim 5, wherein
the data processor is configured to execute processing configured to transmit the data to the external device when the controller reports that transmitting of the data is possible and receiving a request for a transmission of the data from the external device.

8. The device of claim 7, wherein
the controller is configured to report to the data processor that the close proximity wireless transfer is unavailable when the close proximity wireless transfer has become unavailable by the coupler and the close proximity wireless transfer device after reporting that transmit of the data is possible, and to report again to the data processor that the close proximity wireless transfer is available when the close proximity wireless transfer has become available and a measured value from the pressure sensitive sensor becomes not smaller than a threshold value after reporting that the close proximity wireless transfer is unavailable; and
the data processor is configured to interrupt processing of a transmission of data when it is reported that the close proximity wireless transfer is unavailable, and to restart processing of a transmission of the data to the external device when it is reported again that the close proximity wireless transfer is available.

* * * * *